United States Patent [19]
Vrbanac

[11] Patent Number: 5,708,458
[45] Date of Patent: Jan. 13, 1998

[54] METHOD OF AND APPARATUS FOR USING THE DIGITIZER SENSOR LOOP ARRAY OF A COMPUTING DEVICE AS AN ANTENNA FOR A RADIO FREQUENCY LINK TO AN EXTERNAL DATA SOURCE

[75] Inventor: Michael E. Vrbanac, Livermore, Calif.

[73] Assignee: Compaq Computer Corporation, Houston, Tex.

[21] Appl. No.: 356,706

[22] Filed: Dec. 15, 1994

[51] Int. Cl.$^6$ ................................................. H03M 11/00
[52] U.S. Cl. ........................ 345/156; 343/728; 345/168; 345/169; 364/709.1; 395/200.1
[58] Field of Search .................................. 178/17 R, 18; 343/728, 732, 798, 824, 869, 891; 345/156, 157, 158, 168, 169, 170, 173, 175, 179, 180, 181, 182; 364/709.1; 375/7, 75, 83, 88, 89; 395/200.1

[56] References Cited

U.S. PATENT DOCUMENTS

| | | | |
|---|---|---|---|
| 4,613,866 | 9/1986 | Blood | 343/448 |
| 4,672,154 | 6/1987 | Rodgers et al. | 178/19 |
| 4,903,326 | 2/1990 | Zakman et al. | 455/89 |
| 5,007,085 | 4/1991 | Greanias et al. | 380/25 |
| 5,049,863 | 9/1991 | Oka | 340/710 |
| 5,138,118 | 8/1992 | Russell | 178/19 |
| 5,138,328 | 8/1992 | Zibrik et al. | 343/702 |
| 5,381,160 | 1/1995 | Landmeier | 345/174 |
| 5,440,502 | 8/1995 | Register | 364/708.1 |
| 5,525,981 | 6/1996 | Abernathy | 341/34 |

OTHER PUBLICATIONS

Christopher Barr, "Pen PCs," PC Magazine, vol. 11, No. 19 (Nov. 10,1992), pp. 175–178, 183, 186, 200.
Ed Perratore, "Sharp's Non–Newtonian PDA," BYTE, vol. 18, No. 18 (Oct. 1993), pp. 69, 74, 82, 84, 100, 105–106, 108, 110–112.
Christopher Barr & Michael Neubarth, "Pen Pals," PC Magazine, vol. 12, No. 17 (Oct. 12, 1993), pp. 117, 134, 136, 138, 143–145, 157–158, 169–170, 174, 179, 182.

Primary Examiner—Mark R. Powell
Assistant Examiner—Vincent E. Kovalick
Attorney, Agent, or Firm—Pravel, Hewitt, Kimball & Krieger

[57] ABSTRACT

A pen-enabled computer system in which the digitizer sensor loop array is employed as a radio frequency antenna for receiving signals from an external signal source such as a wireless keyboard or wireless local area network interface. This radio frequency datalink arrangement allows for greatly enhanced freedom of movement when using external system components, as well as reduced component count and weight.

37 Claims, 5 Drawing Sheets

METHOD OF AND APPARATUS FOR USING THE DIGITIZER SENSOR LOOP ARRAY OF A COMPUTING DEVICE AS AN ANTENNA FOR A RADIO FREQUENCY LINK TO AN EXTERNAL DATA SOURCE

BACKGROUND OF THE INVENTION

1. Field of the Invention

The invention relates to a pen-enabled computer system with a digitizer and an external radio frequency data source. More specifically the invention relates to such a computer using its digitizer sensor loop array as an antenna for receiving RF signals from an external keyboard or other device.

2. Description of the Related Art

Pen-based computing is a rapidly evolving area in the field of personal computer systems. These systems allow the user to input data by writing directly on the screen of a typically notepad sized or smaller system. Historically, the digitizing tablet used for detecting pen placement was opaque and completely separate from the display. Today, however, most of these systems incorporate a transparent digitizing tablet overlayed with a flat-panel liquid crystal display (LCD). Some of these systems come with an integrated keyboard, while others provide a port for an external keyboard.

All digitizing tablets contain a sensing area that detects the pen position. The sensing area can be based on a variety of physical effects, including electromagnetic fields, electrostatic signals, resistive films, and capacitive/electrostatic films. Perhaps the most common is the electromagnetic (EM) digitizer. In this technology, an evenly spaced planar grid of horizontal and vertical conductors—generally wires or conductive traces on a printed circuit board—within the tablet represent an x-y coordinate grid. These conductors are typically wired as loops to detect an electromagnetic field.

There are two main types of EM digitizers—those that use a passive pen with an active grid, and those that use an active pen with a passive grid. The first type operates by radiating a signal from under the screen. A coil in the pen, which is usually tethered to the computer, sends the pen's position back to the computer. In the second and more prevalent technology, a continuous grid acts as an antenna on the tablet surface. A small wire coil inside the battery-powered pen generates a low-intensity magnetic signal that induces a small voltage or current in some of the grid wires. This voltage or current is inversely proportional to the distance between the conductors and the pen coil. Many grid-based tablets use the strongest signal wires in the x-y grid lines to obtain a coarse pen position, and then interpolate the signal readings from adjacent wires on the grid to compute a more precise position.

A third type of EM digitizer uses the grid in a passive manner, however, the grid has a loop around it that transmits a pulse to the pen. When the pen is placed near the grid, a tank circuit in the batteryless pen is activated, thereby oscillating a current in a small wire coil inside the pen and creating a magnetic field that is detected by the circuitry connected to the grid. The detection circuitry is similar to the circuitry used in the active pen/passive grid digitizer above.

A digitizer tablet controller generally consists of an integrated circuit(s) that scans the sensing area, detects the position of the pen, and translates a changing pen position into a series of x-y coordinate pairs representing the coordinate location of the cursor or pen coil. The controller also generates hardware interrupts when the pen is in sufficient proximity with the tablet display to be detected.

In addition to a digitizer tablet of some sort, many pen-enabled computer systems also provide for the use of a keyboard. In current systems, this keyboard is typically either integrated into the system or tethered to the main computer with electrical cabling. Both of these arrangements restrict freedom of use and mobility. In addition, wire cabling tends to add weight, which is undesirable in portable products, and usually requires physical connections that may wear out over time and exposure to the environment.

Infrared transmission links have been used in an effort to remedy cabling problems, but this approach presents problems of its own. Specifically, infrared requires line of sight between the transmitting and receiving units, and can be blinded by strong ambient light. This is a particular problem in infrared wireless local area networking (WLAN) solutions. RF solutions also exist. These systems, however, require the addition of an antenna, which may detrimentally alter the size or cost of the computer system.

Many purchasers of contemporary pen-enabled computers, such as car rental agencies, express delivery services, and other business with work forces involved in the collection of field data, could benefit from flexible systems that could be used as writing tablets in the field, yet still allow for conventional keyboard data entry or networking. Thus it is clearly desirable to develop a method for establishing an untethered communication link between an external data input device, such as a keyboard or WLAN interface, and the rest of the computer system that only minimally adds to that system's size or cost. This link would ideally allow a keyboard or any other data input device to be positioned in any manner within relative proximity to the main computer.

SUMMARY OF THE INVENTION

A computer system constructed according to the present invention provides a wireless data link between a pen-enabled computer system and an external serial data signal source such as a keyboard or a wireless local area network (WLAN) interface. In addition to receiving data from a pen input device, the digitizer sensor loop array in a pen-enabled system is employed as a radio frequency (RF) antenna for receiving signals from such a secondary external signal source.

Specifically, the electric cabling or infrared data link of conventional designs is replaced by an antenna/receiver arrangement in which a serial datastream is transmitted by an external source, received by utilizing the loops in the digitizer sensor array as an antenna, and demodulated and differentiated from the pen signal.

In a system constructed according to the present invention, circuitry is added to the main computer for receiving and demodulating a serial datastream from a source other than the pen input device. This serial data stream signal is differentiated from the pen signal, for example using filters or using well known data encoding/decoding techniques. In one embodiment, this circuitry might include a receiver amplifier, a bandpass filter for isolating the transmitter frequency, and demodulation circuitry such as frequency-shift keying or phase-shift keying.

Adding such circuitry allows a computer operator to use system components such as a keyboard without being tethered to the computer or burdened with line of sight restrictions. In addition, by utilizing a pre-existing system component as the antenna, size, weight and cost savings can be realized.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
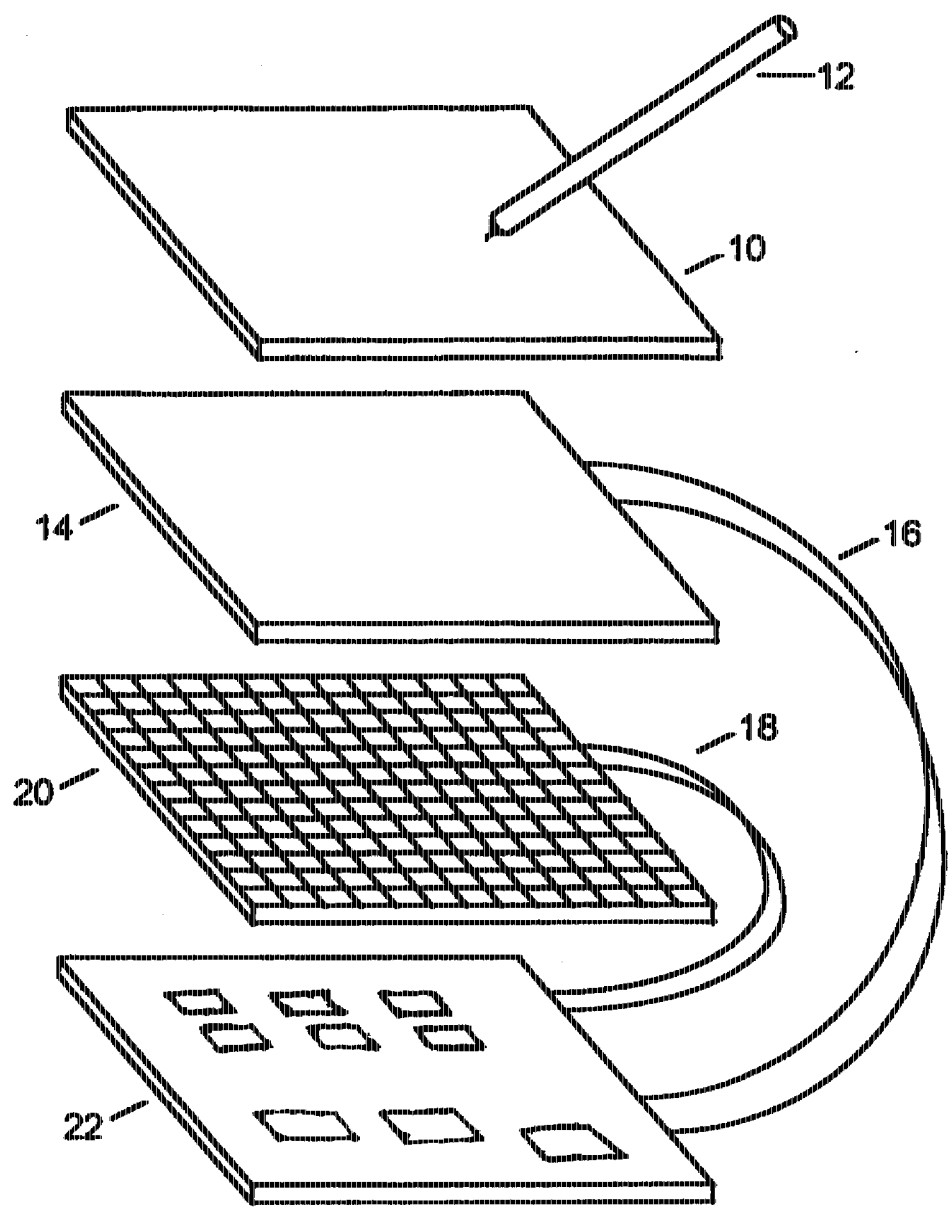
FIG. 1 is a drawing of a digitizer tablet integrated with an LCD display according to the prior art.

Referring now to FIG. 1, a drawing of a digitizer that has been integrated with a liquid crystal display (LCD) 14 is shown. A glass plate 10 serves as a writing surface for a digitizer pen 12. The glass plate 10 also covers and protects the LCD 14. Cabling 16 electrically connects the LCD 14 to a printed circuit board 22. A wire-grid sensor 20 underlays the LCD 14, and is electrically connected to the printed circuit board 22 by cabling 18. In this prior art technology, the printed circuit board 22 underlays the wire-grid sensor 20 in the integrated tablet.

When the pen 12 is sufficiently close to the glass surface 10, it induces signals in the wires of the wire-grid sensor 20. These induced analog signals are sent to the printed circuit board 22 via cabling 18, where the system processes these signals to determine the x-y pen coordinates. The x-y coordinate data for use by a microprocessor is extracted, and the system generates a return signal and sends it to the LCD 14 via cabling 16, lighting the appropriate pixels or otherwise performing the proper task.

It is understood that other display technologies exist in addition to LCDs, such as CRTs, electroluminescent (EL), and so on. One of ordinary skill in computer and digitizer design will recognize that concepts of the invention can be readily adapted to such alternate display technologies. Additionally, it is contemplated that some systems will energize the wire-grid sensor 20, instead of the digitizer pen 12. In such systems, each internal wire provides a known signal, with the digitizer pen 12 picking up these signals-and returning the resultant coordinate pair. In such a system, the pen will act as the antenna for receiving the digitizer signals, but it is contemplated that when such an "active" grid is used according to the invention, the grid rather than the pen would act as the antenna for external RF signals.

The wire-grid sensor 20 is usually placed on the bottom surface of the LCD 14; otherwise, the digitizer's wires might create visible lines over the LCD 14. However, the placement of the wire-grid sensor 20 is not critical to the present invention, and even use of an integrated display is not necessary.

By using an LCD with an integrated digitizer like the one depicted in FIG. 1, an RF antenna can be added to a computer system without changing its designed form factor. This aspect of the invention may have particular importance in the laptop segment of the computer market.

Figure 2:
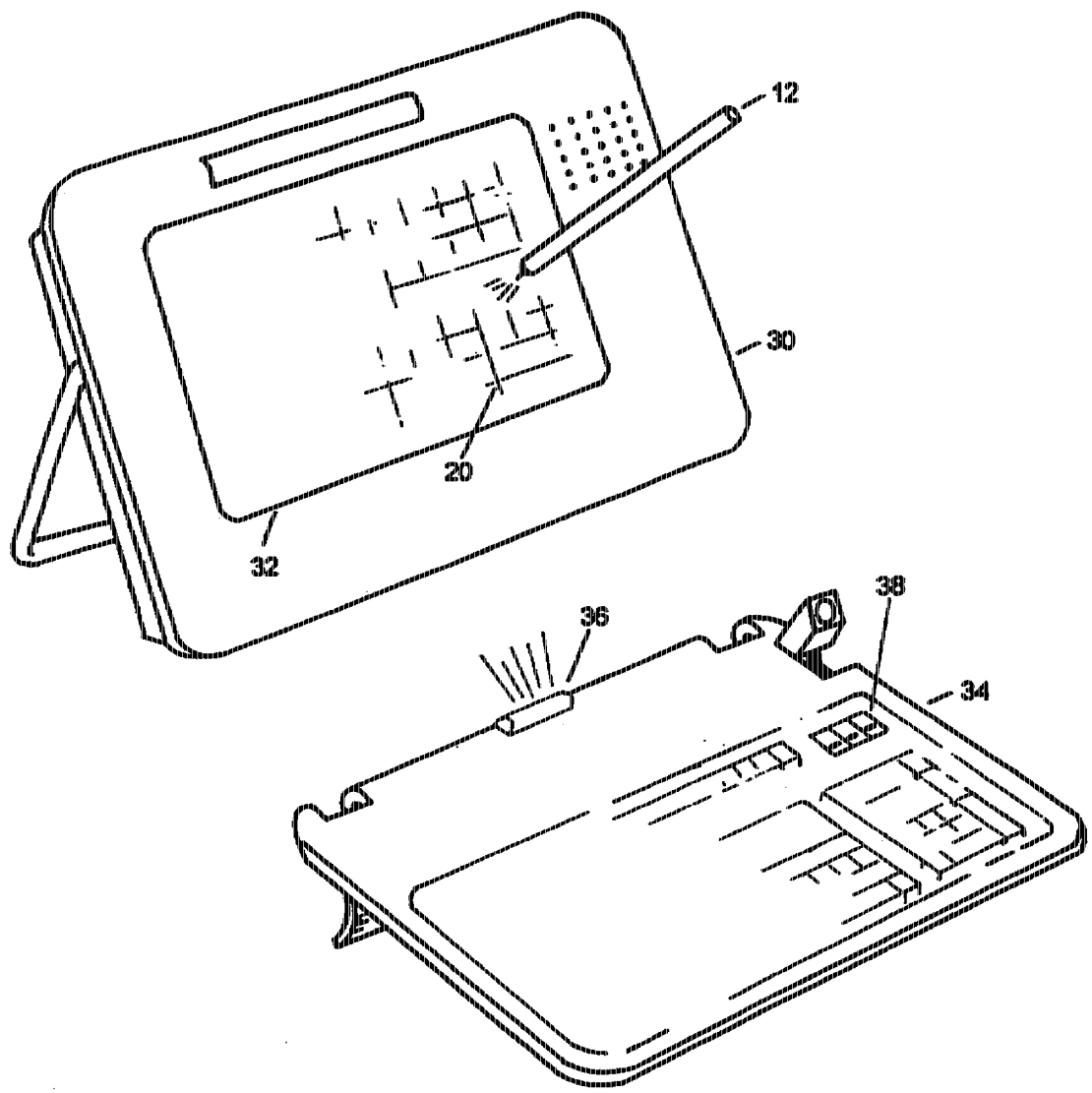
FIG. 2 is a perspective view of a pen-enabled computer system taking advantage of the present invention by incorporating a wireless data link between the main computer and an external keyboard.

Turning to FIG. 2, an embodiment of a pen-enabled computer system incorporating a wireless data link between a main computer 30 and an external keyboard 34 is shown. An LCD 32 is shown with an integrated wire-grid sensor 20, as discussed above in conjunction with FIG. 1. The digitizer pen 12 is shown in a normal use position. An external keyboard 34 is connected to the main computer 30 via a wireless RF data link provided by a keyboard transceiver 36 and the wire-grid sensor 20, which acts as an antenna. The external keyboard 34 also includes a set of LEDs 38 for displaying the status of keyboard functions like Num Lock, Caps Lock, and Scroll Lock.

As is discussed below in conjunction with FIG. 3, RF signals transmitted from the external keyboard 34 are captured by the wire-grid sensor 20. These signals are then processed separately from the digitizer pen 12 signals. Techniques for encoding and transmitting the keyboard data, apparent to those skilled in the art, are not shown for sake of clarity. By integrating a transceiver 36 into the external keyboard 34, it is also possible for the keyboard 34 to receive signals from the main computer 30. These signals may perform functions such as control of the LEDs 38.

Implementing wireless RF connectivity between a computer and other system components provides a number of benefits. As illustrated in FIG. 2, the user's keyboard 34 is not tethered to the main computer 30 by the typical electrical cabling. This feature of the present invention provides greatly enhanced freedom of movement, in addition to saving important space and weight in compact computer systems. Because the present invention operates on RF principles, the user is not hampered by the line of sight restrictions found in infrared solutions. The transmission frequency is not important except to insure proper operation and compatibility with other equipment.

While other RF solutions exist, these systems require the addition of an antenna. In contrast, the present invention utilizes as an antenna the sensor loop array that is already present in ppen-enabledbased/digitizer systems, thereby saving both space and manufacturing costs.

Figure 3:
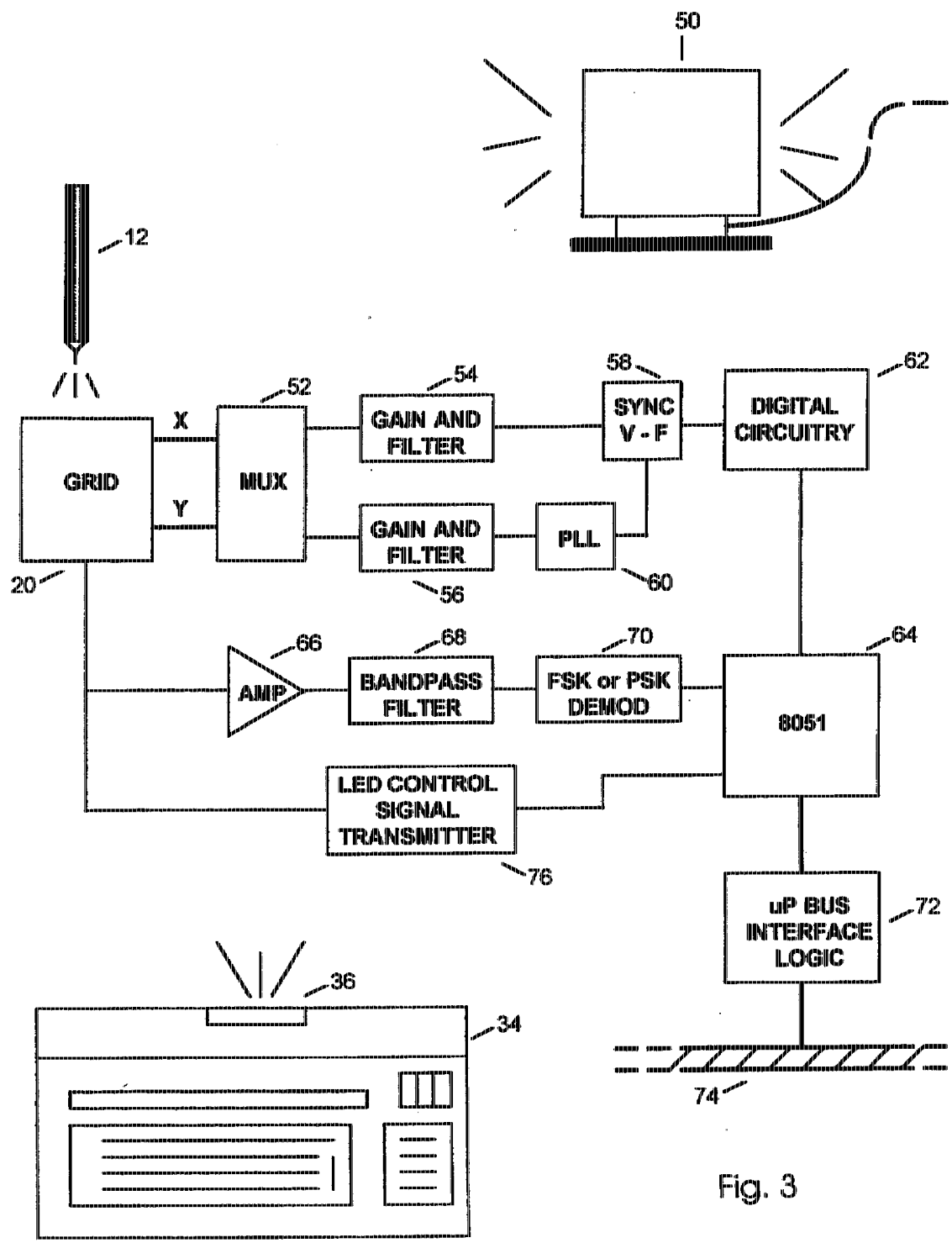
FIG. 3 is a block diagram of a portion of a computer system in which the apparatus and method according to the invention could be implemented.

FIG. 3 is block diagram of a portion of a system in which the apparatus and method according to the invention could be implemented. The wire-grid sensor 20 acts as an antenna to receive an RF signal from an external data signal source exemplified by the digitizer pen 12, the keyboard 34, and a wireless local area networking interface 50. Signals generated by the digitizer pen 12 are handled separately from other signals. In this embodiment, analog signals from individual x-y wires in the wire-grid sensor 20 are fed into a multiplexer 52. The multiplexer 52 scans the inputs and switches individual lines to gain and filter blocks 54 and 56. The gain and filter blocks 54 and 56 amplify and bandpass filter the signals from the wires to isolate and differentiate the digitizer pen 12 signal from data signals of different frequencies from other external sources. In the present embodiment, the output of the gain and filter block 54 is used by a synchronous voltage-to-frequency convertor block 58 to reconstruct and convert data signal amplitude information from both x and y grid lines. As discussed below, the synchronous voltage-to-frequency converter block 58 converts the analog signal provided by the gain and filter block 54 into frequency-based data that can be handled in the digital realm. The voltage-to-frequency converter block 58 offers an attractive alternative to other analog-to-digital converters, especially where signal isolation or outstanding linearity is needed.

Under the control of digital circuitry 62 further described below, the multiplexer 52 selects a line with a relatively strong signal for input to the gain and filter block 56. The output of the gain and filter block 56 is input to a phase locked loop (PLL) 60. The PLL 60 locks onto the digitizer pen 12 carrier signal frequency, and provides a reference AC voltage signal to the synchronous voltage-to-frequency converter block 58 to aid in recovering the original signal input to the gain and filter block 54. The synchronous voltage-to-frequency converter block 58 then provides an output signal of a frequency proportional to the amplitude of the AC signal from the gain and filter block 54 relative to the amplitude of the reference AC signal from the PLL 60. The output of the synchronous voltage-to-frequency converter block 58 is provided to the digital circuitry 62, which successively selects, using the multiplexer 52, x-axis and y-axis scan lines centered around the x- and y-axis lines with the strongest signals. From the relative strengths of these "adjacent" signals, the digital circuitry 62 interpolates the x-y location data to determine pen placement. This information is sent to microcontroller 4, preferably an 8-bit microcontroller such as the 8051 from Intel Corporation programmed to emulate an 8042 keyboard controller. This substitution is well known to the art. The microcontroller 64 linearizes the data, adjusts for pen tilt, and performs various other massaging of the digitizer data as is well known in digitizer design.

In the present embodiment, the datastream from either the external keyboard 34 or the wireless LAN interface 50 is handled separately and differentiated from digitizer pen 12 data. These external devices transmit data at a frequency different than that of digitizer pen 12. One or more loops in wire-grid sensor 20 are connected to the input of an RF amplifier 66. The output of the RF amplifier 66 is then filtered by bandpass filter 68, which is constructed to pass signal frequencies encompassing the transmission frequency of the external keyboard 34 or the wireless LAN interface 50, while blocking other frequencies, such as those from the digitizer pen 12. This signal is demodulated by frequency-shift keying (FSK) or phase-shift keying (PSK) techniques in a demodulation block 70. These demodulation techniques are well known in the art. Once demodulated, data is sent from the output of the demodulation block 70 to the microcontroller 64, which then converts this data into keyboard scan codes or serial data. In the disclosed embodiment, the microcontroller 64 is connected to microprocessor interface logic block 72, which in turn couples the microcontroller 64 to a microprocessor bus 74. The logic block 72 preferably appears to the microcontroller 64 as memory mapped I/O registers and to the bus 74 as I/O registers.

In addition to using the wire-grid sensor 20 as a receiving antenna, the disclosed embodiment also uses it as a transmitting antenna. In particular, LED control signals generated by the microcontroller block 64 are sent to the wire-grid sensor 20 via an LED control signal transmitter block 76. Preferably, the LED control signals are generated between scans of the wire-grid sensor 20. This block 76 modulates the LED control signals for reception by a keyboard transceiver 36. The external keyboard 34 uses these signals to control the on/off status of the LEDs 38. Alternatively, the signal transmitter block 76 could be configured for communication with a wireless LAN interface 50. This configuration is discussed below in conjunction with FIG. 5.

It is understood that FIG. 3 is an exemplary embodiment of the logic arrangement of the receive/transmit circuitry, and other arrangements could be readily developed, with modulation techniques other than FSK or PSK, and other changes as readily apparent to those skilled in the art. For example, all of the gain and filter blocks 54, 56, and 66, as well as the related circuitry could be readily combined on a single application specific integrated circuit incorporating digital signalprocessing circuitry. Another alternative is to use a common amplifier for amplifier 66 which provides an output to the bandpass filter 68, as before, and to a filter section which replaces the and filter block 56.

Figure 4:
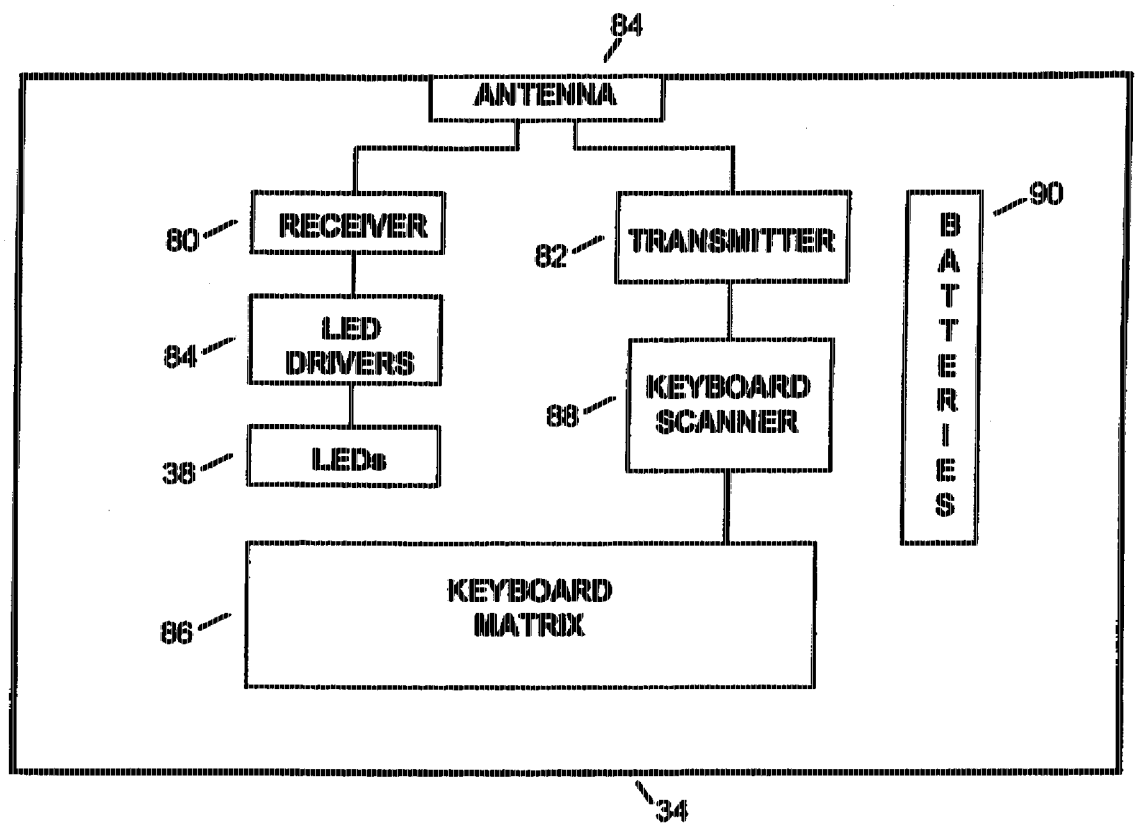
FIG. 4 is a block diagram of keyboard circuitry that could be used as part of the disclosed invention.

FIG. 4 is a block diagram of keyboard circuitry that could be incorporated within the keyboard 34. The sub-elements of the transceiver circuitry 36 described above in reference to FIG. 3 are shown. These elements include a receiver 80 and a transmitter 82, each of which is coupled to an antenna 84. The keyboard circuitry also includes LED drivers 84 connected to the receiver 80 and the LEDs 38. These LED drivers 84 are controlled by the LED control signals, also discussed above, received by the receiver 80.

The keyboard matrix 86 is typically composed of a multitude of scan lines which are connected to the keyboard scanner 88. Each key is connected as a switch to two of these scan lines, with a key depression viewed by the keyboard scanner 88 as a short circuit between two scan lines. The transmitter 82 receives the keyboard data from the keyboard scanner 88 and uses it to modulate a carrier signal. Encoding may also take place in the transmitter 82 circuitry. Batteries 90 provide power to the keyboard circuitry.

Figure 5:
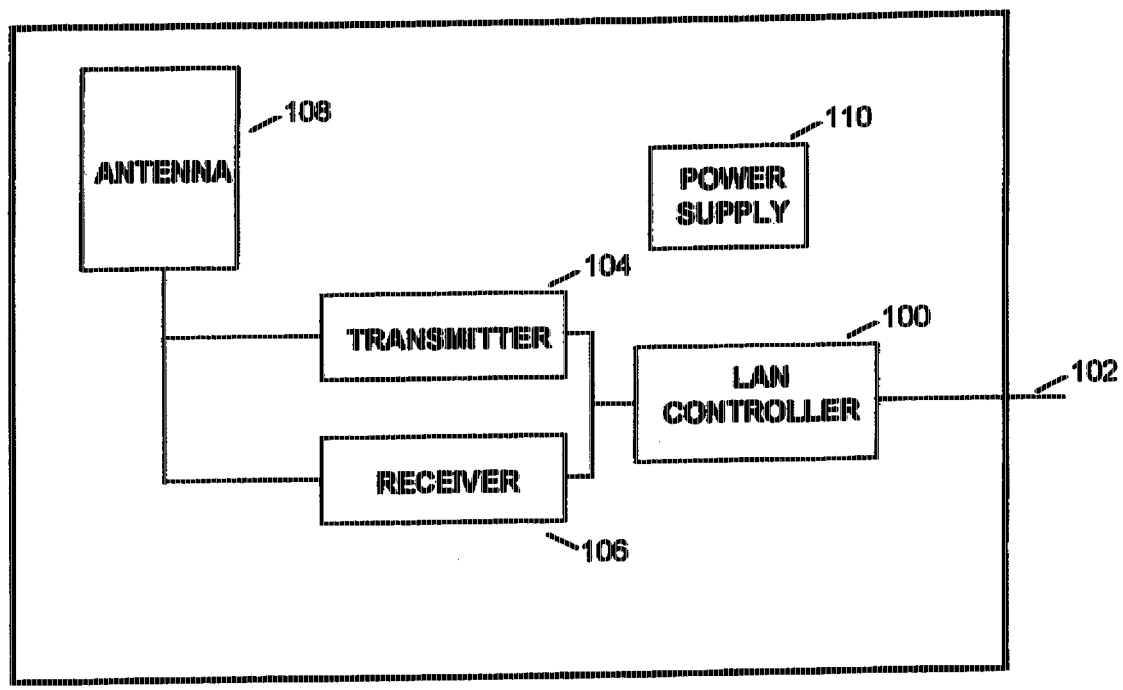
FIG. 5 is a block diagram of circuitry internal to a wireless local area network interface that could be used as part of the disclosed invention.

FIG. 5 is a block diagram of circuitry internal to the wireless LAN interface 50. A LAN controller chip 100 communicates with other network elements via a wired LAN port 102. The LAN controller chip 100 is also connected to a transmitter 104 and receiver 106, each of which are in turn connected to an antenna 108. These last three elements allow the wireless LAN interface 50 to transmit and receive radio frequency serial data signals, thereby enabling an untethered communication link between the main computer 30 and the rest of the network. The wireless LAN interface 50 is powered by a power supply 110.

In another contemplated embodiment of the invention, a separate wire added to the sensor loop array 20 could be used as the antenna.

In yet another contemplated embodiment, selection of different operating frequencies for the digitizer pointing device and the wireless keyboard 34 is not necessarily required. With a single frequency transmission link, data encoding/decoding techniques could be used to differentiate the signals.

The foregoing disclosure and description of the preferred embodiment are illustrative and explanatory, and many modifications and alternate embodiments are possible. For example, one of ordinary skilled in the art could adapt the digitizer array as an antenna for use with devices other than those mentioned herein. Also, the exact configuration of the digitizer circuitry or choice of microcontrollers is not critical to the invention. Other changes in the size, shape, materials, components, circuit elements, wiring connections and contacts, as well as in the details of the illustrated circuitry and construction and method of operation may be made without departing from the spirit of the invention.

I claim:

1. A pen-enabled computer system for use with an external radio frequency serial data signal source including a radio frequency transmitter for transmitting a serial datastream radio frequency signal, the computer system comprising:

a digitizer pen;

a digitizer sensor loop array for cooperatively communicating with said digitizer pen and for receiving the serial datastream radio frequency signal, wherein the serial datastream radio frequency signal is provided by a source other than said digitizer pen; and receiver circuitry electrically coupled to said digitizer sensor loop array, said receiver circuitry including means for retrieving the serial datastream radio frequency signal received by said digitizer sensor loop array and for providing a digital signal responsive to the serial datastream radio frequency signal.

2. The computer system of claim 1, wherein said digitizer pen provides a pen radio frequency signal, and further comprising:

digitizer control circuitry coupled to said digitizer sensor loop array, said digitizer control circuitry including means for differentiating said pen radio frequency signal from the serial datastream radio frequency signal and means for translating said pen radio frequency signal received by said digitizer sensor loop array into pen location data for use by said computer system.

3. The computer system of claim 2, wherein the serial datastream radio frequency signal is modulated at a frequency different than the transmission frequency of the pen radio frequency signal, and wherein said means for differentiating includes a first filter tuned to pass the serial datastream radio frequency signal and a second filter tuned to pass said pen radio frequency signal.

4. The computer system of claim 2, wherein said means for differentiating includes data decoding circuitry for separating said pen radio frequency signal from the serial datastream radio frequency signal.

5. The computer system of claim 1, in which said external radio frequency serial data signal is provided by an external keyboard.

6. The computer system of claim 5 in which the keyboard includes light emitting diodes (LEDs) and keyboard receiver circuitry for reception of LED radio frequency control signals, the computer system further comprising:

transmitter circuitry electrically coupled to said digitizer sensor loop array, said transmitter circuitry transmitting an LED control signal developed by said computer system for reception by the keyboard receiver circuitry for controlling LEDs on said external keyboard.

7. The computer system of claim 6, wherein said digitizer sensor loop array is integrated in a liquid crystal display unit.

8. The computer system of claim 1, in which said external radio frequency serial data signal is provided by a wireless computer networking interface.

9. The computer system of claim 1, wherein said means for retrieving includes frequency shift keying demodulation circuitry.

10. The computer system of claim 1, wherein said means for retrieving includes phase shift keying demodulation circuitry.

11. The computer system of claim 1, wherein said digitizer sensor loop array is integrated in a liquid crystal display unit.

12. A pen-enabled computer system with wireless connectivity, the pen-enabled computer system comprising:

an external keyboard transmitting a serial datastream radio frequency signal;

a pen-enabled computer, including:
 a digitizer pen;
 a digitizer sensor loop array for cooperatively communicating with said digitizer pen and for said serial datastream radio frequency signal from said external keyboard; and
 receiver circuitry electrically coupled to said digitizer sensor loop array, said receiver circuitry including means for retrieving the serial datastream radio frequency signal received by said digitizer sensor loop array and for providing a digital signal responsive to the serial datastream radio frequency signal to the pen-enabled computer.

13. The computer system of claim 12, wherein said digitizer pen provides a pen radio frequency signal, said pen-enabled computer further comprising:

digitizer control circuitry coupled to said digitizer sensor loop array, said digitizer control circuitry including means for differentiating said pen radio frequency signal from the serial datastream radio frequency signal and means for translating said pen radio frequency signal received by said digitizer sensor loop array into pen location data for use by said computer system.

14. The computer system of claim 13, wherein the serial datastream radio frequency signal is modulated at a frequency different than the transmission frequency of the pen radio frequency signal, and wherein said means for differentiating includes a first filter tuned to pass the serial datastream radio frequency signal and a second filter tuned to pass said pen radio frequency signal.

15. The computer system of claim 13, wherein said means for differentiating includes data decoding circuitry for separating said pen radio frequency signal from the serial datastream radio frequency signal.

16. The computer system of claim 12, wherein said keyboard includes light emitting diodes (LEDs) and keyboard receiver circuitry for reception of LED radio frequency control signals, said pen-enabled computer further comprising:

transmitter circuitry electrically coupled to said digitizer sensor loop array, said transmitter circuitry transmitting an LED control signal developed by said computer system for reception by the keyboard receiver circuitry for controlling LEDs on said external keyboard.

17. The computer system of claim 16, wherein said digitizer sensor loop array is integrated in a liquid crystal display unit.

18. The computer system of claim 12, wherein said means for retrieving includes frequency shift keying demodulation circuitry.

19. The computer system of claim 12, wherein said means for retrieving includes phase shift keying demodulation circuitry.

20. The computer system of claim 12, wherein said digitizer sensor loop array is integrated in a liquid crystal display unit.

21. A system with wireless connectivity, the system comprising:

a wireless local area network interface transmitting a serial datastream radio frequency signal;

a pen-enabled computer, including:
 a digitizer pen;
 a digitizer sensor loop array for cooperatively communicating with said digitizer pen and for receiving said serial datastream radio frequency signal; and
 receiver circuitry electrically coupled to said digitizer sensor loop array, said receiver circuitry including means for retrieving the serial datastream radio frequency signal received by said digitizer sensor loop array and for providing a digital signal responsive to the serial datastream radio frequency signal to the pen-enabled computer.

22. The system of claim 21, wherein said digitizer pen provides a pen radio frequency signal, said pen-enabled computer further comprising:

digitizer control circuitry coupled to said digitizer sensor loop array, said digitizer control circuitry including means for differentiating said pen radio frequency signal from the serial datastream radio frequency signal and means for translating said pen radio frequency signal received by said digitizer sensor loop array into pen location data for use by said computer system.

23. The system of claim 22, wherein the serial datastream radio frequency signal is modulated at a frequency different than the transmission frequency of the pen radio frequency signal, and wherein said means for differentiating includes a first filter tuned to pass the serial datastream radio frequency signal and a second filter tuned to pass said pen radio frequency signal.

24. The computer system of claim 22, wherein said means for differentiating includes data decoding circuitry for separating said pen radio frequency signal from the serial datastream radio frequency signal.

25. A method for establishing a radio frequency data link between a pen-enabled computer system and an external serial data signal source, wherein the external serial data source is other than a pen, comprising the steps of:

transmitting a serial datastream from the external serial data signal source;

utilizing the digitizer sensor loop array of the pen-enabled computer system as an antenna for reception of said serial datastream; and demodulating said serial datastream for use as an input to said pen-enabled computer system.

26. The method of claim 25, in which said external serial data signal source is a wireless computer networking interface.

27. The method of claim 25, in which said external serial data signal source is an external keyboard.

28. The method of claim 27, further comprising the step of:

utilizing said digitizer sensor loop array as an antenna for transmitting an LED control signal developed by said computer system for controlling LED's on said external keyboard.

29. A pen-enabled computer system for use with an external radio frequency serial data signal source including a radio frequency transmitter for transmitting a serial datastream radio frequency signal, the computer system comprising:

a digitizer pen;

a digitizer sensor loop array for cooperatively communicating with said digitizer pen and for receiving the serial datastream radio frequency signal, wherein the serial datastream radio frequency signal is provided by a source other than said digitizer pen; and receiver circuitry electrically coupled to said digitizer sensor loop array, said receiver circuitry including demodulation circuitry for retrieving the serial datastream radio frequency signal received by said digitizer sensor loop array and for providing a digital signal responsive to the serial datastream radio frequency signal.

30. The computer system of claim 29, wherein said digitizer pen provides a pen radio frequency signal, and further comprising:

digitizer control circuitry coupled to said digitizer sensor loop array, said digitizer control circuitry including discrimination circuitry for distinguishing said pen radio frequency signal from the serial datastream radio frequency signal and digital circuitry for translating said pen radio frequency signal received by said digitizer sensor loop array into pen location data for use by said computer system.

31. The computer system of claim 29, further comprising a keyboard, wherein said external radio frequency serial data signal is provided by said keyboard.

32. The computer system of claim 31, wherein said keyboard comprises:

light emitting diodes (LEDs); and keyboard receiver circuitry for receiving LED radio frequency control signals; and the computer system further comprising:

radio frequency transmitter circuitry electrically coupled to said digitizer sensor loop array, said radio frequency transmitter circuitry utilizing said digitizer sensor loop array as an antenna in transmitting an LED control signal developed by said computer system for reception by said keyboard receiver circuitry.

33. The computer system of claim 29, wherein said digitizer sensor loop array is integrated in a liquid crystal display unit.

34. The computer system of claim 29, wherein said digitizer sensor loop array is integrated in an active matrix display.

35. The computer system of claim 29, wherein said digitizer sensor loop array is integrated in a field emission display.

36. A system with wireless connectivity, the system comprising:

a wireless local area network interface transmitting a serial datastream radio frequency signal;

a pen-enabled computer, comprising:

a digitizer pen;

a digitizer sensor loop array for cooperatively communicating with said digitizer pen and for receiving the serial datastream radio frequency signal; and receiver circuitry electrically coupled to said digitizer sensor loop array, said receiver circuitry including demodulation circuitry for retrieving the serial datastream radio frequency signal received by said digitizer sensor loop array and for providing a digital signal responsive to the serial datastream radio frequency signal.

37. The system of claim 36, wherein said digitizer pen provides a pen radio frequency signal, and further comprising:

digitizer control circuitry coupled to said digitizer sensor loop array, said digitizer control circuitry including discrimination circuitry for distinguishing said pen radio frequency signal from the serial datastream radio frequency signal and digital circuitry for translating said pen radio frequency signal received by said digitizer sensor loop array into pen location data for use by said computer system.

\* \* \* \* \*